3,497,584
Patented Feb. 24, 1970

3,497,584
METHOD OF PREPARING POLYSACCHARIDE FILMS AND FIBER- OF PAPER-REINFORCED POLYSACCHARIDE FILMS
Douglas J. Bridgeford, Danville, Ill., and Dudley M. Gallagher, New Orleans, La., assignors to Tee-Pak, Inc., Chicago, Ill., a corporation of Illinois
No Drawing. Original application Apr. 22, 1963, Ser. No. 274,863, now Patent No. 3,336,144, dated June 26, 1967. Divided and this application Mar. 29, 1967, Ser. No. 626,715
Int. Cl. B29d 7/02, 23/04
U.S. Cl. 264—137          8 Claims

ABSTRACT OF THE DISCLOSURE

A film of regenerated polysaccharide is formed by forming a film of an aqueous solution of an ammonium film-forming polysaccharide xanthate, such as ammonium cellulose xanthate or ammonium amylose xanthate, and heating the same to regenerate the polysaccharide film therefrom. The film may be formed as a flat film or may be extruded through an annular die to produce a tubular casing. Also, the solution of ammonium film-forming polysaccharide xanthate may be used to impregnate a fibrous web or paper to form a paper-reinforced or fiber-reinforced film on heating.

CROSS-REFERENCE TO RELATED APPLICATIONS

This application is a division of our copending application Ser. No. 274,863, filed Apr. 22, 1963, now U.S. Patent 3,336,144.

BACKGROUND OF THE INVENTION

Viscose has been known as an intermediate in the preparation of cellulose compositions for about seventy years. Sodium cellulose xanthate was discovered by Cross and Bevan in 1892. It results from the interaction of carbon disulfide and alkali cellulose. A dilute aqueous alkaline solution of cellulose xanthate is known as viscose ("viscous cellulose") and consists of a mixture of sodium cellulose xanthate of varying molecular size, loosely combined with sodium hydroxide and dispersed in this solution together with alkalization and xanthation by-products. In commercial practice, the viscose is allowed to age until it reaches the desired ripeness and then is extruded through a die into an acid medium (or other coagulating agent) to regenerate cellulose having the configuration of the die through which the viscose was extruded. Thus, viscose is extruded through fine holes to produce filaments, through slits to produce films, or through an annular opening to produce a tube. Viscose has also been used for impregnating paper or fabric for regenerating cellulose therein by subsequent treatment with an acid. Various attempts have also been made to regenerate the viscose thermally to avoid the necessity for the acid resistant equipment required in acid regeneration of cellulose. The acid regeneration of viscose and thermal regeneration of viscose both result in the formation of salts and other undesirable by-products which necessitate extensive washing and purification of the regenerated cellulose. Polysaccharides, e.g. starch, amylose, dextran, sugars, etc., are known to form alkali derivatives of which the corresponding xanthates can be prepared by reaction with carbon disulfide. The purification of these materials and regeneration of polysaccharide films therefrom present problems which are similar to the purification and regeneration of cellulose from viscose. The preparation of derivatives of polysaccharide xanthates which could be thermally regenerated with the production of volatile by-products is highly desirable.

In the preparation of viscose and other polysaccharide xanthates, many undesired by-products are formed. In the past, viscose and other polysaccharide zanthic solutions have been regenerated by treatment with acid with the result that relatively large amounts of salts are formed within the regenerated material. It has been impractical to reduce the proportion of salts in the regenerated polysaccharide by neutralization of the aqueous caustic solution due to the fact that any attempt to neutralize excess caustic with strong acid results in a localized region of very low pH and high salt concentration which tends to coagulate the polysaccharide and produce the heterogeneous product.

In the copending patent application of Douglas J. Bridgeford, Ser. No. 200,621, filed June 7, 1962, now U.S. Patent No. 3,291,789, a process was disclosed in which film-forming polysaccharides, such as cellulose, starch, amylose, dextran, etc., in the form of caustic xanthate solutions are decausticized by dialysis, ion exchange, and/or ion retardation. That process is of primary interest for decausticized viscose solutions or caustic solutions of amylose xanthate but is also applicable to decausticizing of caustic aqueous solutions of other polysaccharide xanthates. In the Bridgeford decausticization process, an aqueous caustic solution, preferably containing 0.01–7.0% wt. of a polysaccharide xanthate, is subjected to dialysis or to treatment with an ion exchange or ion retardation resin. In most cases, it is preferred to work with more dilute solutions to avoid formation of a gel as the solution is decausticized. That process results in polysaccharide xanthate solutions, such as viscose or amylose xanthate, which are substantially free of alkali. However, the acid regeneration of decausticized polysaccharide xanthates still results in the formation of an appreciable amount of by-product salts.

In our parent application, Ser. No. 274,863, filed Apr. 22, 1963, now U.S. Patent 3,336,144, we disclosed that polysaccharides, particularly film-forming polysaccharides, such as cellulose, starch, amylose, dextran, etc., in the form of caustic xanthate solutions can be converted by an ion exchange reaction into ammonium salts which are relatively stable in aqueous solutions and can be thermally regenerated with the production of volatile by-products. This process is of primary interest for converting viscose solutions into solutions of ammonium cellulose xanthate or for converting caustic solutions of sodium amylose xanthate into solutions of ammonium amylose xanthate, but is equally applicable to converting other caustic solutions of polysaccharide xanthates into the corresponding salts. In carrying out the process of this invention, the reaction conditions are not especially critical. It is preferred to work with the viscose or other polysaccharide xanthate solutions in somewhat dilute form for convenience in handling. In general, it is preferred to work with aqueous caustic solutions containing 0.1–7.0% wt. of polysaccharide in the form of the xanthate. The process can be carried out batch-wise or continuously, but it is preferred to pass the dilute polysaccharide xanthate solution through a column containing the ion exchange resin. In carrying out this invention, the polysaccharide xanthate solution is contacted with a cation exchange resin in the ammonium form. When the polysaccharide xanthate solution is passed countercurrently to a column of ion exchange resin in the ammonium form, the solution is converted to an ammonium polysaccharide xanthate solution containing ammonium hydroxide as a stabilizing component.

In some cases, it may be desirable to subject the viscose or other alkaline solution of polysaccharide xanthate to dialysis or to ion exchange or ion retardation to remove excess alkali prior to treatment with the ammonium exchange resin. When the polysaccharide xanthate solution is given such a preliminary treatment, the yields based on the ammonium exchange resin are greater since less of the ammonium ion is used in ion exchange reaction with free alkali in the solution.

SUMMARY OF THE INVENTION

This invention comprises a new and improved method for the preparation of polysaccharide films and fiber- or paper-reinforced polysaccharide films. A solution of an ammonium polysaccharide xanthate is prepared as described in our parent application, Ser. No. 274,863, filed Apr. 22, 1963, now U.S. Patent 3,336,144. The solution of ammonium polysaccharide xanthate, which may be ammonium cellulose xanthate, ammonium amylose xanthate, or the like, is spread as a film and regenerated thermally. The thermal decomposition of the polysaccharide xanthate causes the water to be driven off and causes most of the decomposition by-products to be driven off as gaseous by-products. The preparation of polysaccharide films by thermal decomposition of ammonium polysaccharide xanthates is especially useful in the formation of flat films of the cellophane type and in the formation of tubular films, by extrusion through an annular die, which are useful as caps or bands or sausage casings. The thermal regeneration of polysaccharide films from solutions of ammonium polysaccharide xanthates is also a useful means for the preparation of fiber-reinforced or paper-reinforced films. The solutions of ammonium polysaccharide xanthates can be used to impregnate fiber webs or paper and the polysaccharide regenerated thermally to produce a fiber- or paper-reinforced polysaccharide film. This procedure is especially useful in the preparation of fiber- or paper-reinforced sausage casings.

PREPARATION OF AMMONIUM XANTHATES BY ION EXCHANGE REACTION

The following non-limiting examples are illustrative of the preparation of ammonium polysaccharide xanthate solutions by ion exchange reaction:

Example 1

A commercial viscose solution was converted to a solution of ammonium cellulose xanthate by ion exchange reaction. The viscose used was a commercial viscose solution, ripened and ready for extrusion, and containing about 8% cellulose, 6.6% total alkali (total of free sodium hydroxide and combined sodium in the cellulose xanthate), 0.9% xanthate sulfur, and having a DP of about 500 (DP is degree of polymerization and represents the average number of anhydroglucose groups per cellulose molecule). The viscose was diluted to a 1% cellulose content in preparation for ion exchange reaction.

A glass column (2.5 cm. x 20 cm.) was filled with Amberlite IRC 50 H resin (a carboxylic exchange resin in the acid form). The ion exchange resin in the column was converted from the acid form to the ammonium form by passing a 5% aqueous ammonia solution through the column. The heat evolved from the reaction could be followed down the column as the aqueous ammonia was added.

After conversion of the resin to the ammonium form was complete, 80 g. of diluted viscose (1% cellulose content) was passed through the column. The column was connected to aspirator vacuum to provide an additional force drawing the viscose through the resin bed. The effluent from the column was a yellow-green solution having a pH of 9.5 which consisted of alkaline solution of cellulose xanthate in which substantially all of the sodium had been exchanged for ammonium ions.

The aqueous alkaline solution of ammonium cellulose xanthate was stable upon storage at 8° C. for several days. When ammonium cellulose xanthate is extruded into an acid regenerating bath, regenerated cellulose is formed in the same manner as from the acid regeneration of viscose. When ammonium cellulose xanthate is formed into a film or filament and heated, the cellulose is regenerated and the by-products of the regeneration are almost entirely volatile. Carbon disulfide, ammonia, and hydrogen sulfide constitute substantially the entire by-products of the decomposition of ammonium cellulose xanthate.

Example 2

A stainless steel pressure column (2" x 30") was charged with 300 g. of Dowex 50W–X8, 50–100 mesh ion exchange resin supported on a 100-mesh screen. Dowex 50W–X8 is a strongly acidic cation exchange resin (sulfonated polystyrene) which was supplied to the column in the acid form. The resin was converted from the acid form to the ammonium form by treatment with aqueous ammonia as described in the previous example.

An 8% cellulose content viscose, as used in Example 1, was diluted with distilled water to a 1.13% cellulose concentration. A 700 g. portion of the diluted viscose was passed through the ion exchange column in a period of five minutes under an applied gas pressure of 37 p.s.i.

The effluent from the column was reddish brown in color, having a very strong ammonia odor. The product of the ion exchange reaction was a solution of ammonium cellulose xanthate having a 1.13% cellulose concentration and was stabilized by free ammonium hydroxide in solution. A 50 ml. portion of 1% ammonium cellulose xanthate solution was shaken on a laboratory shaker at 160 cycles per minute for five hours at 27° C. After one hour of shaking, the color had changed from a reddish brown to a medium green and later changed to a yellowish green. After five hours, the shaking was stopped and no signs of coagulation were seen. This ammonium cellulose xanthate solution is useful in the preparation of films and fibers of regenerated cellulose by coagulation with acid or other regenerating media or by thermal decomposition.

We have found that viscose and analogus polysaccharide xanthate solutions can be converted to the ammonium form by treatment with cation exchange materials in the ammonium form. Substantially all of the free alkali and viscose (are related polysaccharide xanthate solutions) and the combined alkali therein can be exchanged for ammonium ion by reaction with a cation exchange material in the ammonium form, preferably by passing the polysaccharide xanthate solution through a column containing the resin. While the process is preferably carried out using commercially obtainable high capacity ion exchange resins, it is effective to a substantial degree with any material having cation exchange properties which can be converted to the ammonium form. The following ion exchange materials are illustrative of cation exchangers which can be used in this process: sulfonated phenolic resins (prepared by condensation of phenol sulfonic acid with formaldehyde, or by alkaline condensation of sodium phenolate with sodium sulfite and formaldehyde), e.g. Zeo-Karb 215, Zeo-Karb 315, Amberlite IR 1, Amberlite IR 100, Duolite C 10, Duolite C 3, Dowex 30; polystyrene sulfonates crosslinked with divinyl benzene, e.g. Zeo-Karb 225, Amberlite IR 120, Duolite C 20, Dowex 50, and Nalcite HCR; sulfonated coal, e.g., Zeo-Karb H 1; nuclear substituted phosphonate resins, e.g. Duolite C 60 and Duolite C 61; carboxylic resins, e.g. carboxylated phenol formaldehyde resins, Zeo-Karb 216, and copolymers of acrylic acid with divinyl benzene; Zeo-Karb 226, Amberlite IRC 50, Duolite CS 100, acid treated Zeolites; naturally occurring non-resinous ion exchange materials, e.g. cellulose, wood fibers (bast fiber) including fabricated forms thereof such as webs, papers, fabric, and the like. The reference to ion exchange resins in the claims is intended to be generic to ion exchange material of the high capacity resinous type, to liquid ion exchangers, and to naturally occurring nonresinous ion exchange materials, such as acid treated coal, cellulose wood fibers, fabrics, webs, papers, and the like, which are known to have cation exchange properties and which can be converted to the ammonium form for reaction with polysaccharide xanthates.

Example 3

The ion exchange column as described in Example 2 is charged with 150 g. Duolite C 60 resin and treated with 5% aqueous ammonia to convert the resin to the ammonium form. About 500 ml. of viscose, diluted to 0.5% Cellulose content, is allowed to feed through the column under gravity feed at a rate of about 1 ml. per minute. The effluent from the column is collected and consists of a light yellow green colored liquid which comprises an aqueous ammoniacal solution of ammonium cellulose xanthate.

Example 4

The ion exchange column as described in Example 2 is charged with 150 g. Zeo-Karb 226 resin and treated with 5% aqueous ammonia to convert the resin to the resin to the ammonium form. About 500 ml. of viscose, diluted to 0.5% cellulose content, is allowed to feed through the column under gravity feed at a rate of about 1 ml. per minute. The effluent from the column is collected and consists of a light yellow green colored liquid which comprises an aqueous ammoniacal solution of ammonium cellulose xanthate.

Example 5

The ion exchange column as described in Example 2 is charged with 150 g. Amberlite IR 120 resin and treated with 5% aqueous ammonia to convert the resin to the ammonium form. About 500 ml. of viscose, diluted to 0.5% cellulose content, is allowed to feed through the column under gravity feed at a rate of about 1 ml. per minute. The effluent from the column is collected and consists of a light yellow green colored liquid which comprises an aqueous ammoniacal solution of ammonium cellulose xanthate.

Example 6

The ion exchange column as described in Example 2 is charged with 150 g. Dowex 50WX 4 H resin and treated with 5% aqueous ammonia to convert the resin to the ammonium form. About 500 ml. of viscose, diluted to 0.5% cellulose content, is allowed to feed through the column under gravity feed at a rate of about 1 ml. per minute. The effluent from the column is collected and consists of a light yellow green colored liquid which comprises an aqueous ammoniacal solution of ammonium cellulose xanthate.

Example 7

An 8% cellulose viscose solution is diluted to 1% cellulose content. About 100 g. of dilute viscose is then placed in a regenerated cellulose bag and dialyzed by shaking the bag in 1.5 liters of water in a 10-liter polyethylene bottle at 320 cycles per minute. The water is changed twice at 20-minute intervals; then it is changed again and the system left standing at room temperature overnight. The solution which is recovered from the dialysis bag is a liquid having a pH of about 13. When this dialyzed viscose solution is passed through a steel column containing Amberlite IRC 50 resin in the ammonium form, it is converted into a dilute ammoniacal solution of ammonium cellulose xanthate. The yield of ammonium cellulose xanthate based upon the ion exchange resin is more than twice that obtained when viscose is subjected to ion exchange without the preliminary dialysis for removal of excess alkali.

Example 8

A high purity amylose (derived from corn) containing about 10% water and having a DP of about 700–900 is used in the formation of an amylose xanthate solution analogous to viscose.

An alkaline solution of 24% concentration (1580 g. water and 300 g. sodium hydroxide) was prepared and mixed with 300 ml. methanol and 150 g. amylose. The mixed slurry which was formed was stirred for ten minutes and 200 ml. additional methanol added, and the more dilute slurry stirred for one hour at room temperature. The slurry was then mixed with 5.1 liters of methanol to precipitate the amylose. The supernatant layer was decanted and found to contain 270 g. of sodium hydroxide. The gel which remained was left to dry in thin layers and to depolymerize or age.

The alkali amylose which was produced was allowed to dry and age for forty-three hours at room temperature to reduce the DP of the amylose so that high amylose xanthate concentrations in alkali could be obtained. The gel weight was about 870 g. and comprised 12.6% alkali, 16% amylose, and 71% water.

The alkali amylose (870 g.) was spread on the bottom and on the porcelain plate of a 12-inch vacuum desiccator. Nitrogen purging was carried out and a vacuum then applied. About 70 g. of carbon disulfide was drawn into the desiccator and the system allowed to stand in a water bath at room temperature. After about 5.25 hours, the alkali amylose had turned to a carrot yellow-orange color. Vacuum was applied to the desiccator to remove excess carbon disulfide over a period of about twenty minutes. The product obtained consisted of 898 g. of sodium amylose xanthate. This material was refrigerated at $-20°$ C. for six days before solutions were prepared from it.

A solution is prepared by mixing the sodium amylose xanthate with an equal weight of water for two hours using a 2½-inch marine type propellor as an agitator. The mixture is maintained at a temperature less than 15° C. during solution. The resulting viscous solution is filtered through a filter muslin and has a 6% alkali content (both free sodium hydroxide and combined sodium) and 8% amylose content. The 8% amylose content solution of sodium amylose xanthate is diluted with distilled water to produce a solution having a 2% amylose content. This solution is then passed through the stainless steel column used in Example 2, containing 300 g. Amberlite IRC 50 H resin in the ammonium form. The effluent from the column has a strong odor of ammonia and consists of a solution of ammonium amylose xanthate containing a small amount of free ammonium hydroxide.

Example 9

The ion exchange column as described in the previous example is charged with 150 g. Duolite C 60 resin which is converted to the ammonium form by treatment with 5% aqueous ammonia. About 500 ml. of 0.5% amylose content dilute amylose xanthate is allowed to feed through the column under gravity feed at a rate of about 1 ml. per minute. The effluent from the column is collected and consists of a light yellow green colored liquid which is a dilute solution of ammonium amylose xanthate containing a small amount of free ammonium hydroxide.

PREPARATION OF POLYSACCHARIDE FILMS AND REINFORCED POLYSACCHARIDE FILMS FROM AMMONIUM POLYSACCHARIDE XANTHATE SOLUTIONS

Ammonium cellulose xanthate and other ammonium polysaccharide xanthates are useful for a variety of purposes for which the corresponding alkali xanthates are less efficient. The ammonium polysaccharide xanthates form smaller amounts of by-products upon regeneration of the polysaccharide. The ammonium polysaccharide xanthate solutions can be regenerated by treatment with acid as can the alkali xanthates. However, the ammonium polysaccharide xanthates can be regenerated thermally in a very short time or by standing for an extended period of time at room temperature. The thermal regeneration of ammonium polysaccharide xanthates results in the formation of the volatile by-products of reaction. In view of the large number of applications of ammonium polysaccharide xanthate solutions, particularly ammonium cellulose xanthate, it is desirable to set forth a number of such uses in more detail.

Example 10

A clear, dilute ammonium cellulose xanthate solution (0.5% cellulose) having a pH of 8.6 was prepared by ion exchange reaction as described in the previous examples. This solution was used to coat the fibers in a 14.5-pound, unsized, all hemp fiber tissue paper and the cellulose was regenerated therefrom by heating at 105° C. for fifteen minutes. The wet break strength of the resulting cellulose coated paper was in the range from 740–850 g. (Instron test) as compared to break loads of 20–30 g. for untreated paper.

In another test, a more dilute solution (0.25% cellulose content) of ammonium cellulose xanthate, having a pH of 8.8, was used to treat the same tissue paper and thermally regenerated at 105° C. for fifteen minutes. The treated paper had a break load of 500–560 g. (Instron test) as compared to 20–30 g. for the untreated paper.

Example 11

Several experiments were carried out in which dilute solutions of ammonium cellulose xanthate were used to treat various papers to provide improved wet strength. A solution (2% cellulose content) of ammonium cellulose xanthate was diluted to 0.5% cellulose content and used to coat a 14-pound hemp-rayon tissue paper. The coated paper was heated at 100° C. for about fifteen minutes to regenerate the cellulose. The coated paper had a break load of 190–220 g. (Instron test) as compared to 24 g. for untreated paper.

A 14.5-pound all wood pulp tissue paper was treated with a solution (0.5% cellulose content) of ammonium cellulose xanthate. The coated paper was heated at about 100° C. for fifteen minutes to regenerate the cellulose. The paper had a break load ranging from 200–630 g. (Instron test) as compared to 20–30 g. for untreated paper. Several additional sheets of the same paper were treated with the same solutions of ammonium cellulose xanthate and the cellulose thermally regenerated. The break loads (Instron test) varied only slightly within the range reported above.

Another 14.5-pound all wood pulp paper having an untreated break strength of 80–90 g. (Instron test) was treated as described above. The paper was coated with ammonium cellulose xanthate (from 0.5% solution) and the cellulose regenerated by heating at 105° C. for fifteen minutes. The regenerated cellulose addon was 3.1%. The treated paper had a break strength of 500–1100 g. (Instron test). When the same paper was treated with ammonium cellulose xanthate and the cellulose regenerated by conventional acid treatment (3.1% addon) followed by drying (15 min. at 105° C.), the treated paper had a break strength of 110 g. (Instron test).

Example 12

A chopped rayon-hemp (50:50) tissue paper is float coated with a solution of ammonium cellulose xanthate to a 0.5% cellulose addon. The coated paper is dried in an infrared oven and has a Scott wet strength in excess of 300 g./in. as compared to a wet strength of 36 g./in. for the untreated paper.

Experiments carried out in coating various papers with aqueous ammonium cellulose xanthate indicate that the increase in wet strength (and corresponding increase in dry strength) is not dependent upon the technique used to coat the paper but rather is a property of the regenerated cellulose in combination with the paper.

Example 13

A solution of ammonium cellulose xanthate (diluted to 0.5% cellulose content) prepared in accordance with Example 2 is formed on a flat glass surface using a drawbar. A clear, transparent coherent film is obtained which is useful as a packaging film. The film is also adherent to a variety of surfaces when initially formed and thus can be used as a coating material. Thus, the aqueous ammonium cellulose xanthate solutions can be coated on an object and heated to regenerate a cellulose coating. The ammonium cellulose xanthate solutions may be provided with a dye or pigment for desired color when used as a coating material.

A 1% ammonium amylose xanthate solution prepared in accordance with Example 8 is formed into a film as described above and regenerated by heating to a temperature of about 100° C. The resulting film is coherent and strong and is useful as a packaging film or as a coating film.

Example 14

Ammonium cellulose xanthate or ammonium amylose xanthate prepared in accordance with any of the aforementioned examples can be used as an adhesive for forming flat cellulose impregnated paper into tubes suitable for further processing to form meat casings. A 2% cellulose content aqueous ammonium cellulose xanthate solution is used to form an adhesive seam along one edge of a cellulose impregnated 14.5-pound hemp tissue paper. Seaming is accomplished by spreading about three drops of the ammonium cellulose xanthate solution per foot of 0.4-inch wide seam. The material is formed into a tube with a lap seam clamped in a vise and heated with an infrared lamp. The seams which are formed have shear strengths in excess of 10 lb./in. of seam length. The tubes which are thus produced are used as fibrous casings used in meat process. Aqueous ammonium amylose xanthate can be used as a seaming agent for fibrous casing in the same manner.

Example 15

An aqueous solution (0.5% cellulose content) of ammonium cellulose xanthate is extruded through an annular die into a sulfuric acid bath. The cellulose is regenerated in the acid bath in the form of a hollow tubular film suitable for use as a sausage casing. When aqueous ammonium amylose xanthate is extruded through an annular die into an acid bath, a tubular casing is formed in the same manner.

Example 16

A cellulose impregnated high wet strength paper is prepared by impregnating a tissue paper with aqueous ammonium cellulose xanthate (or ammonium amylose xanthate) and regenerating the same by acid or thermal treatment. The paper is continuously formed into tubes (in accordance with commercially used procedures for forming fibrous casings) and impregnated with viscose to a very high cellulose content (paper represents only about 40% wt. of finished product). The impregnated tubing is passed into an acid regenerating bath which converts the viscose into regenerated cellulose. The product which is obtained is commercially used as fibrous casing and is a strong tubing of paper-reinforced regenerated cellulose.

Example 17

A cellulose impregnated high wet strength paper is prepared by impregnating a tissue paper with aqueous ammonium cellulose xanthate (or ammonium amylose xanthate) as described above and regenerating the same by acid or thermal treatment. The paper is then continuously formed into tubes (in accordance with commercial procedures used in the forming of fibrous casings) and impregnated with additional quantities of aqueous ammonium cellulose xanthate (or ammonium amylose xanthate) and heated at 100° C. for about fifteen minutes.

The cellulose is regenerated to produce a strong tubing of paper-reinforced regenerated cellulose which is commercially useable as fibrous casing.

EXAMPLE 18

In the manufacture of cellulose casing for various meat products, one of the principal problems is the smudging and offsetting of inks used to print legends on the casing. When aqueous ammonium cellulose xanthate is sprayed over the freshly printed surface of a cellulose casing and dried at 105° C., a coating is obtained which is completely effective to prevent smudging and offsetting of the printed matter on the casing.

What is claimed is:

1. A method of preparing a regenerated polysaccharide film which comprises forming a film of an aqueous solution of an ammonium film-forming polysaccharide xanthate and heating the same to regenerate the polysaccharide therefrom.

2. A method in accordance with claim 1 in which the polysaccharide is cellulose or amylose.

3. A method in accordance with claim 2 in which the film is extruded through an annular die to produce a tubular casing.

4. A method in accordance with claim 2 in which an aqueous solution of the ammonium xanthate is impregnated in and coated upon a fibrous web to form a fiber-reinforced film and heated to regenerate the polysaccharide therein.

5. A method in accordance with claim 4 in which the fibrous web is paper.

6. A method in accordance with claim 5 in which the paper is formed into an elongated cylinder to produce a tubular casing.

7. A method in accordance with claim 4 in which the ammonium xanthate solution is added to the web in an amount sufficient to produce an addon of 0.01–5.0% of regenerated polysaccharide upon heating.

8. A method in accordance with claim 7 in which the fibrous web is paper.

References Cited

UNITED STATES PATENTS

| | | | |
|---|---|---|---|
| 2,910,380 | 10/1959 | Shiner | 117—166 |
| 3,048,579 | 8/1962 | Hinkle | 260—218 |
| 3,291,789 | 12/1966 | Bridgeford | 260—214 |
| 1,852,466 | 4/1932 | McConnell | 260—218 |
| 1,974,755 | 9/1934 | Schur | 260—218 |

ROBERT F. WHITE, Primary Examiner

JEFFERY R. THURLOW, Assistant Examiner

U.S. Cl. X.R.

260—218; 264— 186, 187, 188, 209, 216, 217, 218

UNITED STATES PATENT OFFICE
CERTIFICATE OF CORRECTION

Patent No. 3,497,584  Dated February 24, 1970

Inventor(s) Douglas J. Bridgeford et al.

It is certified that error appears in the above-identified patent and that said Letters Patent are hereby corrected as shown below:

In the heading to the printed specification, line 3, "OF PAPER-REINFORCED" should read -- OR PAPER-REINFORCED --. Column 2, line 27, "0.01" should read -- 0.1 --. Column 4, line 40, "analogus" should read -- analogous --; line 44, "are" should read -- and --. Column 5, lines 22 and 23, cancel "to the resin".

Signed and sealed this 27th day of June 1972.

(SEAL)
Attest:

EDWARD M. FLETCHER, JR.
Attesting Officer

ROBERT GOTTSCHALK
Commissioner of Patents